C. KIRINO.
MACHINE FOR PEELING TOMATOES.
APPLICATION FILED JAN. 28, 1920.

1,347,385.

Patented July 20, 1920.
6 SHEETS—SHEET 1.

Fig. 1.

WITNESSES

INVENTOR
Charles Kirino
BY
ATTORNEYS

C. KIRINO.
MACHINE FOR PEELING TOMATOES.
APPLICATION FILED JAN. 28, 1920.

1,347,385.

Patented July 20, 1920.
6 SHEETS—SHEET 2.

WITNESSES

INVENTOR
Charles Kirino

BY

ATTORNEYS

C. KIRINO.
MACHINE FOR PEELING TOMATOES.
APPLICATION FILED JAN. 28, 1920.

1,347,385.

Patented July 20, 1920
6 SHEETS—SHEET 3.

INVENTOR
Charles Kirino
BY
ATTORNEYS

WITNESSES

C. KIRINO.
MACHINE FOR PEELING TOMATOES.
APPLICATION FILED JAN. 28, 1920.

1,347,385.

Patented July 20, 1920.
6 SHEETS—SHEET 4.

WITNESSES

INVENTOR
Charles Kirino
BY
ATTORNEYS

C. KIRINO.
MACHINE FOR PEELING TOMATOES.
APPLICATION FILED JAN. 28, 1920.

1,347,385.

Patented July 20, 1920.
6 SHEETS—SHEET 6.

WITNESSES

INVENTOR
Charles Kirino
BY
ATTORNEYS

UNITED STATES PATENT OFFICE.

CHARLES KIRINO, OF OGDEN, UTAH.

MACHINE FOR PEELING TOMATOES.

1,347,385.   Specification of Letters Patent.   Patented July 20, 1920.

Application filed January 28, 1920. Serial No. 354,639.

*To all whom it may concern:*

Be it known that I, CHARLES KIRINO, a subject of the Emperor of Japan, and a resident of Ogden, in the county of Weber and State of Utah, have invented a new and Improved Machine for Peeling Tomatoes, of which the following is a description.

My invention relates to a machine for peeling tomatoes or other vegetables or fruits having a skin of a nature to be loosened by scalding, and more especially relates to a machine through which the fruit is run and whereby the skin of each tomato or the like is divided into sections while on the fruit and subsequent operations performed of scalding the tomato and removing the skin sections. The invention is more especially designed as an improvement on the machine for the indicated purpose, patented by me August 5, 1919, Number 1,312,332.

The invention has for an object to provide a machine of the indicated character in which a more convenient and effective arrangement is provided by disposing the endless belt employed for carrying the fruit through the machine with the runs thereof disposed in a horizontal plane, as distinguished from a belt having its runs in a vertical plane as in my aforenamed patent, and to provide novel organisms for performing the successive operations on the fruit, of a character to effectively perform their respective functions and making for proper coordination with one another and with the conveyer belt disposed as referred to.

A distinguishing feature of the present invention is the provision of means for mechanically performing the final operation of impaling the tomatoes on the individual holders provided on the conveyer belt in connection with which provision is made for placing and initially impaling the tomatoes while guarding against liability of the tomatoes being bruised or crushed in the placing.

A further important feature resides in an improved means for controlling the skin slitting means and operating the same in a manner to act on the tomato after it has been firmly impaled as referred to and whereby the slitting elements are prevented in their reverse movement from displacing or injuring the impaled tomato.

Further important features of the present invention reside in the means and mode of handling the slitted and scalded tomatoes for the final peeling and removal of the skins and the bottom end of the tomato with the bottom extremity of the core, and reside furthermore in characteristic means for the conveying and removal of the peeled tomatoes without injury from their impaled positions on the holders and conveying the same intact to a point adjacent to the point where the tomatoes are manually placed on the holders and started on their course through the machine.

Other distinguishing features and the advantages of the structural elements entering into the illustrated embodiment of the invention will appear as the description proceeds.

Reference is to be had to the accompanying drawings forming a part of this specification, it being understood that the drawings are merely illustrative of one example of the invention.

Fig. 8 is an enlarged detail vertical section on approximately the line 8—8, Fig. 7;

Fig. 12 is a diagrammatic view of the drive gear train for the skin-detaching wheel;

In carrying out my invention in accordance with the illustrated example an endless belt 20 is provided, the runs of which travel in the same horizontal plane or approximately so and have firm support throughout their travel through the medium of rollers 21 turning in brackets 22 on said belt and arranged to travel over the bed 23 of the machine here shown as supported by a framework including legs 25. At intervals the belt links carry holders 26 in the form of vertical spindles adapted to receive and carry the fruit conventionally indicated at A, said spindles rising in the illustrated example through a slot 24$^a$ (Fig. 3) in a table 24 supported in elevated position on standards 24$^b$ or other suitable means. At the feed side of the machine track rails 30 are provided slightly above the table 24 and spaced to present a slot 29 therebetween. On each holder 26 at the upper end is a head 27 having upwardly projecting prongs 28, the prongs traveling in a path to project slightly above the rails 30. The arrangement is such that the operator manually places a tomato on top of a holder 26, the rails 30 acting as a guard and so that the prongs only slightly penetrate the tomato, the weight of the latter resting on the rails 30 along which the tomato travels as the belt is being driven.

Figures 2, 2A:
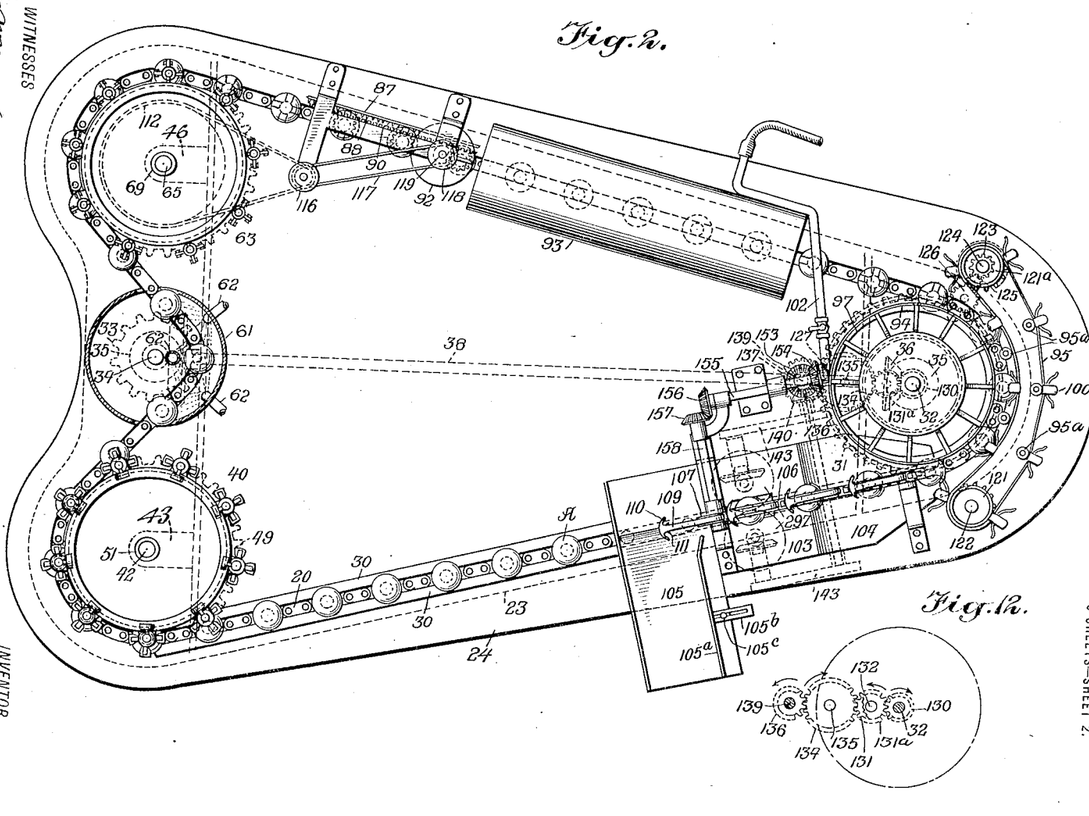
Fig. 2 is a plan view of said machine, the casing of the washing means being shown in section.

Any suitable arrangement of drive means may be provided for the belt, use being made in the present example of a sprocket wheel 31 fixed at one end of the machine on a driven vertical shaft 32 together with a second sprocket wheel 33 about the inside of which the belt 20 is given a bend as best seen in Fig. 2, said wheel 33 being mounted on a vertical shaft 34. The shafts 32 and 34 may be driven by any approved means, the illustrated means including bevel pinions 35 on said shafts and meshing with similar pinions 36, 37 on a drive shaft 38 adapted to be driven from any convenient source of power, there being illustrated a pulley 39 adapted to receive a drive belt.

Figure 1:
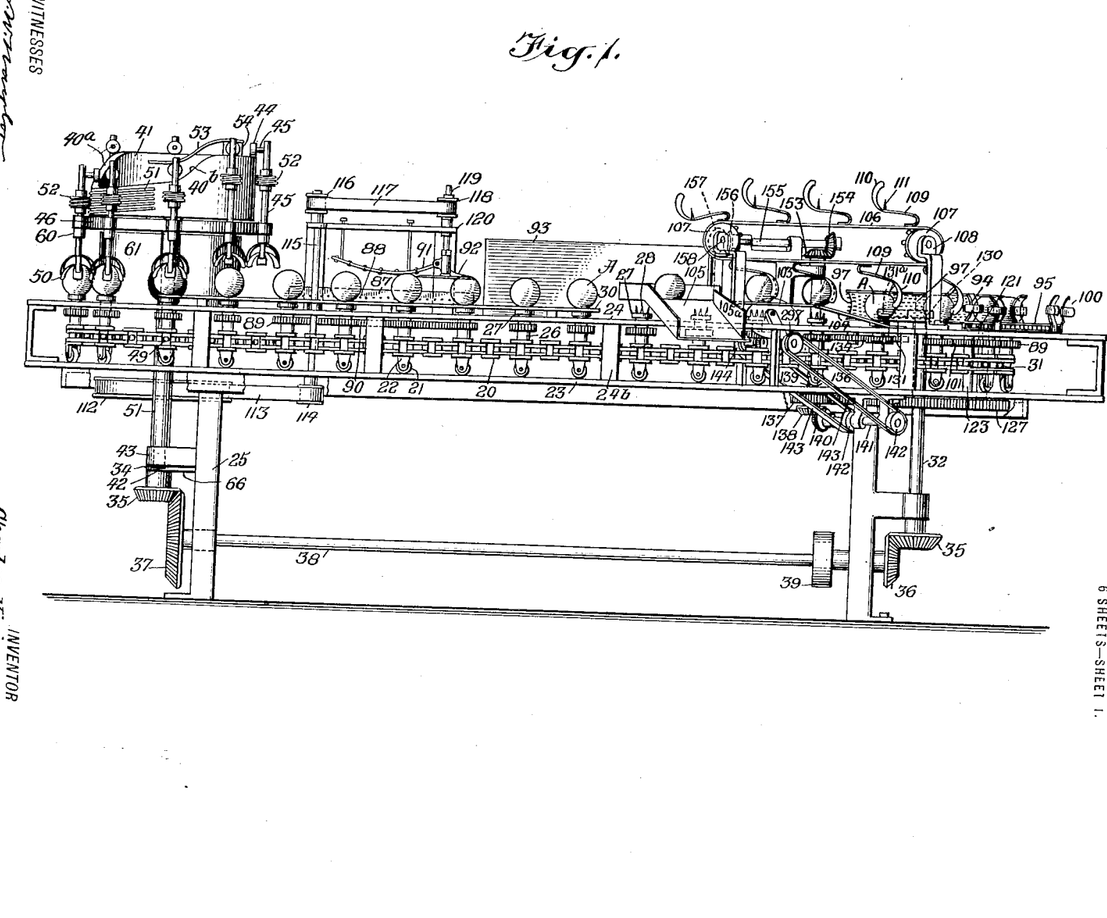
Figure 1 is a side elevation of a machine constructed in accordance with my invention.

The rails 30 extend adjacent to impaling means designated generally by the numeral 40 and comprising the following instrumentalities, to wit: A head 41 having the general functions of a cam is sustained in fixed position, elevated above the rails 30 adjacent to the end of the table and is here shown as mounted on a fixed standard 42 which may be supported at its lower end on a bracket 43 (Figs. 1 and 2) or other fixed supporting device. Said head in practice, is made in the form of a hollow cylinder and presents a cam surface 40$^a$ at the top on which travel rollers 44 of lateral arms 44$^a$ rigid with vertical spindles 45, said spindles being carried by and slidable vertically in a rotary frame 46, the hub of which is secured by set screws 47 or equivalent means to a sleeve 48 loose on the standard 42 so that the sleeve may turn about said standard and cause turning of the frame 46 with the spindles 45, said spindles being disposed about the exterior of the cam head 41. I employ the belt 20 for turning the sleeve 48 and frame 46, in the preferred form of my invention, for which purpose said sleeve has fixed thereon a sprocket wheel 49 about which said belt turns for driving said wheel and the sleeve 48. Each spindle 45 carries a cup-like presser device 50 to engage the fruit, the movement of said spindles about the head 41 as well as the relative positions of the spindles on the frame 46 being such as to time the rotary travel of the devices 50 with the advancing movement of the holders 26 with the fruit A thereon so that a tomato will be brought directly beneath a presser device 50. On the exterior of the head 41 is a series of parallel arcuate spaced ribs 51 more or less slightly oblique and the cam surface 40$^a$ dips toward said ribs to permit the rollers 44 and spindles 45 to move downwardly, in correspondence with said cam surface. To coact with the ribs 51 a series of annular exterior beads 52 is provided on each spindle 45 adapted to enter the spaces between said ribs as the spindles travel forwardly. Above the downward trend or dip 40$^b$ of the cam surface 40$^a$ is a plate spring 53 following the general curvature of said surface, said spring being fixed at one end on a block 54 on cylinder 41 or other suitable means. With the described arrangement as a spindle 45 is carried toward the front of the cylinder 41 it will pass beneath the spring 53 and ride downwardly on the descending surface 40$^b$, the ribs 52 being finally positioned to enter between the ribs 51. As the spindle is carried forwardly a holder 26 with the tomato A will be positioned beneath the presser device 50 of the spindle, so that the tomato is caused to move forwardly on the rails 30 at the same speed as the spindle. The downward movement of the spindle on the surface 40$^b$ due to the action of spring 53 will depress the presser device 50 to contact with the top of the tomato.

Thus, when a tomato arrives directly beneath a spindle 45, with both moving forwardly at the same speed, the spindle is moved downwardly by the travel of its roller 44 on the cam surface 40^b and comes to rest on the tomato. The spring 53 is at the same time engaged by the roller 44. The cam surface is such that the roller leaves the cam surface and has its sole support on the tomato, being subject to a slight pressure by the spring 53. There is now a space between the under side of the roller 44 and the cam surface, the arrangement permitting the presser device 50 and spindle 45 to accommodate themselves to tomatoes of different sizes. At the same time the ribs 52 on the spindle will be in line with the ribs 51 on head 41 ready to engage the latter irrespective of the vertical movement of the spindle within the range of sizes of the tomatoes and thereby the co-engaging ribs 51, 52 will maintain the presser device 50 in proper engagement with the tomato as the latter travels forwardly and upon the tomato leaving the track 30 the pressure exerted by the presser device will completely impale the tomato until it comes to a bearing on the top surface of the head 27 of holder 26 as at the left of Fig. 3.

Figures 3, 4, 5, 6:
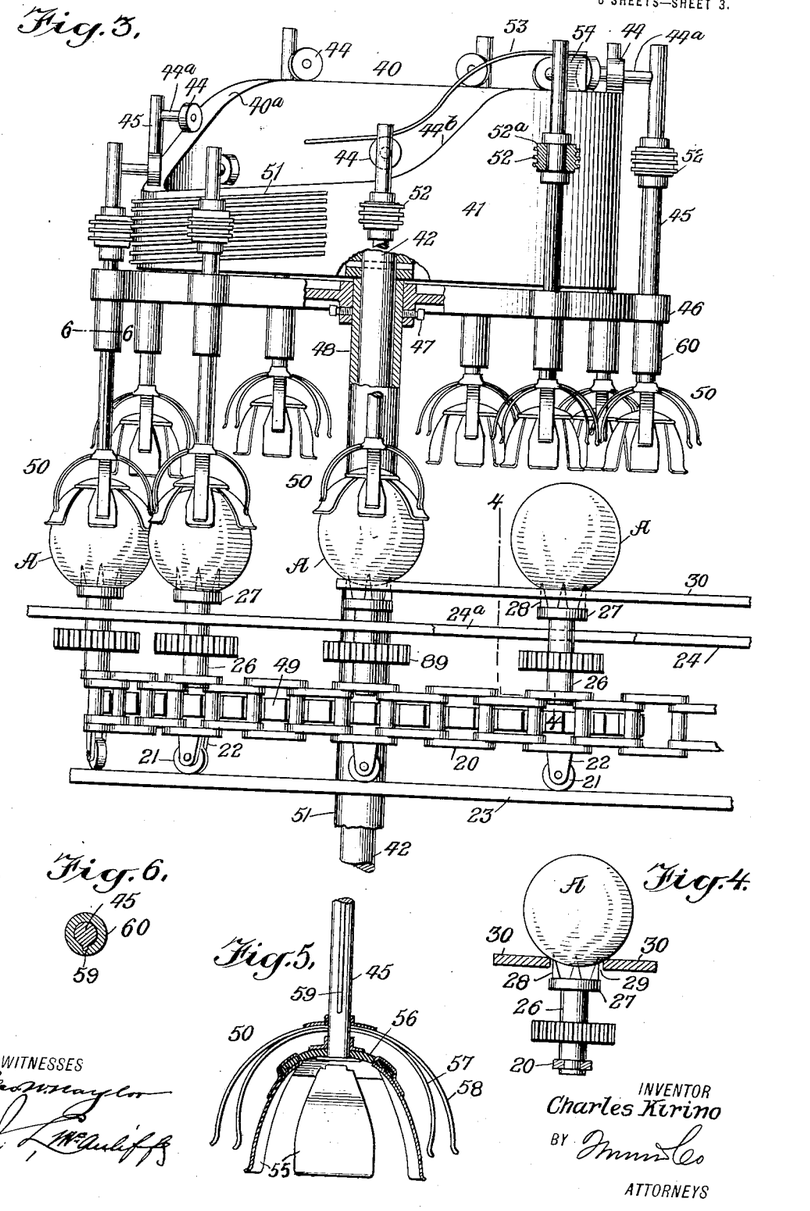
Fig. 3 is a side elevation on an enlarged scale showing means for causing the tomatoes to be firmly impaled on the elements of the conveyer belt.
Fig. 4 is a detail in cross section on the line 4—4, Fig. 3.
Fig. 5 is a detail in vertical section of one of the units employed to effect the impaling of the fruit.
Fig. 6 is a detail in cross section on the line 6—6, Fig. 3.

The form of the presser device 50 is best shown in Fig. 5 and comprises a group of fingers 55 jointly forming a resilient cup and secured in the present example to a rubber or like resilient disk 56 suitably secured to the spindle 45 at the lower end. Outside of the fingers 55 spring elements 57 are provided and secured suitably to the spindle 45 above the disk 56 to further give resiliency to the presser cup and said springs 57 are backed by arms 58 having sufficient rigidity to limit the outward movements of the elements 55 and springs 57, said arms being made rigid in any desired way with the spindle 45 above said springs. To properly guide the spindles 45 in their up and down movements each spindle is formed in the present example with a spline 59 accommodated in a corresponding vertical groove in the frame 46 and in a depending integral sleeve 60 at the under side of said frame. From the impaling mechanism 40 the holders 26 travel with the impaled tomatoes thereon about said impaling means and lateral of the machine to and through a suitable washer 61, here shown as having a spray pipe 62, the belt 20 passing through said washer and being given a bend therein about the sprocket wheel 33, at the inner side of the latter.

Figure 7:
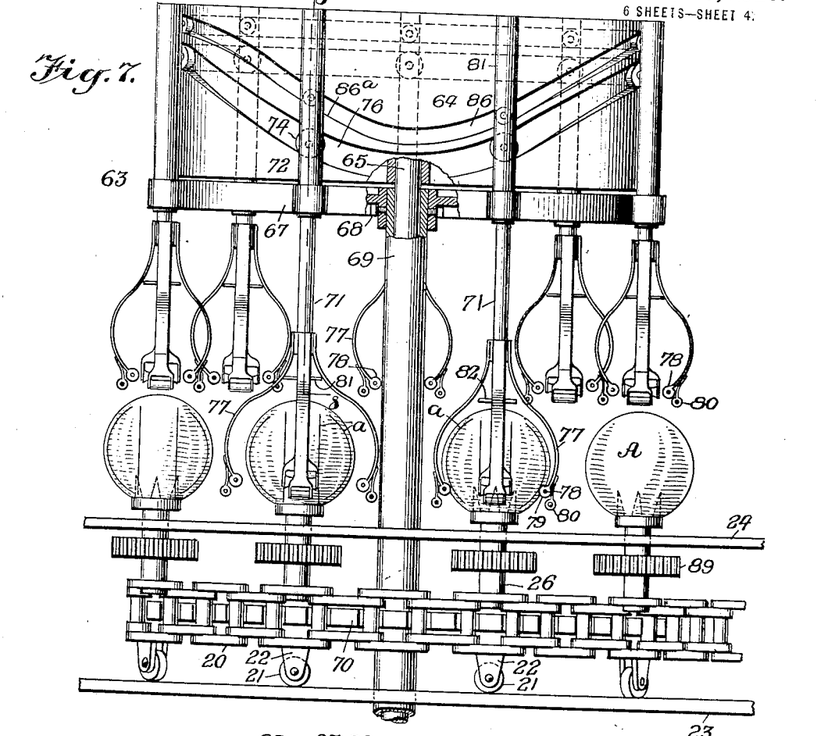
Fig. 7 is a side elevation on an enlarged scale with parts in section, showing the means for slitting the skins of the fruit, Fig. 8ᵃ illustrating a detail thereof.
Figure 8:
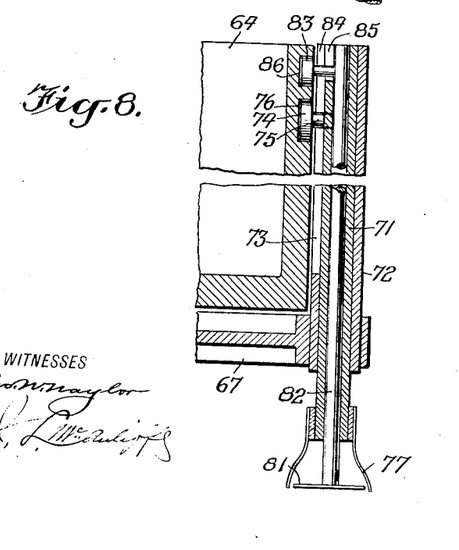
Figure 8A:
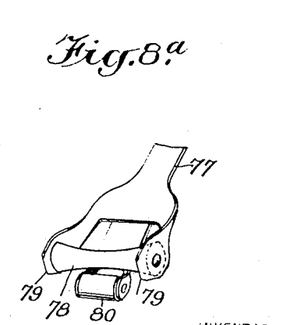
Figure 9:
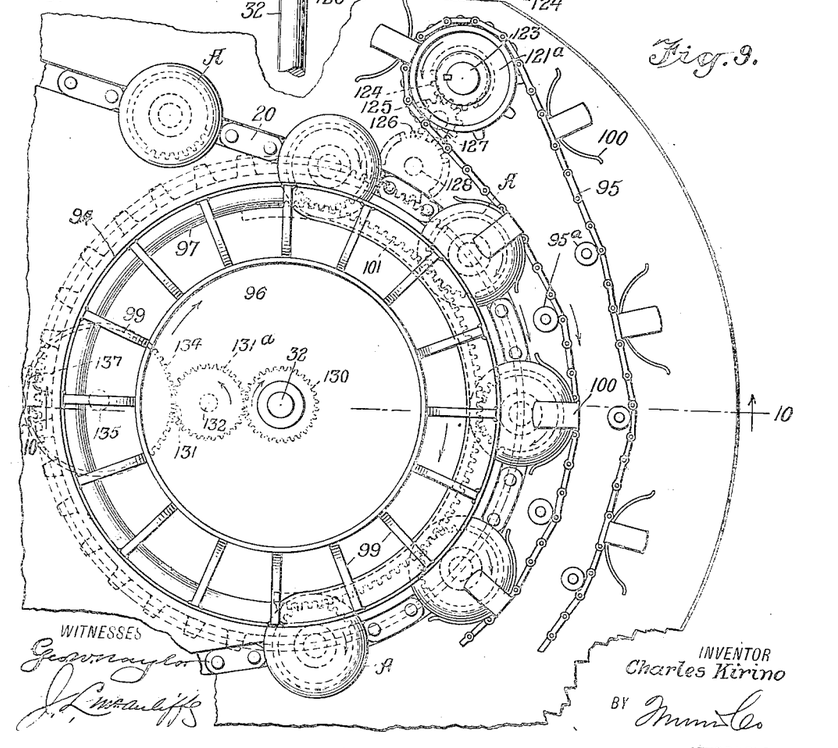
Fig. 9 is an enlarged plan view of the skin-removing device or peeler proper.
Figure 10:
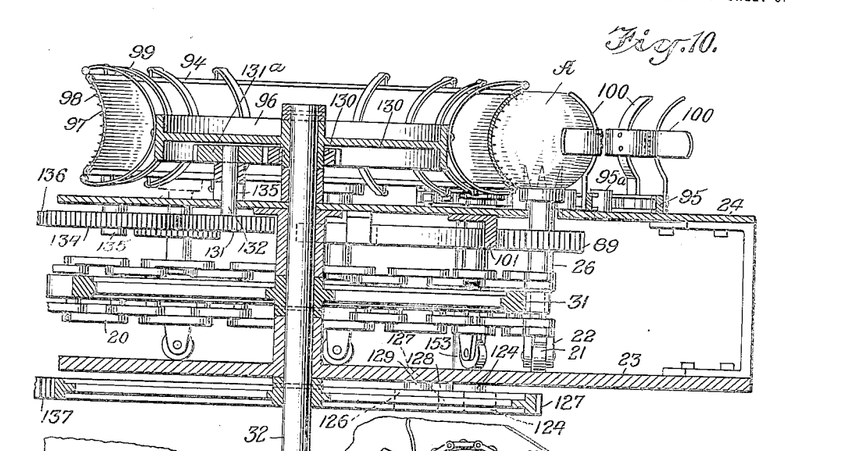
Fig. 10 is a longitudinal vertical section on the line 10—10, Fig. 9.
Figure 11:
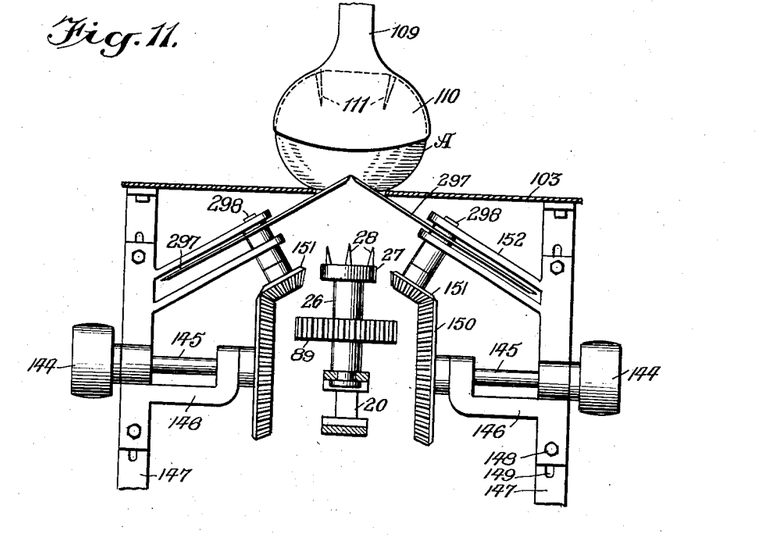
Fig. 11 is an end view of the device for cutting off the bottom of the tomato in removing the bottom end of the core hereinafter referred to as the coring device, the table being in transverse vertical section and the view including the holders on which the individual tomatoes are impaled, showing the relation of the holder to the elements of the coring device.
Figure 13:
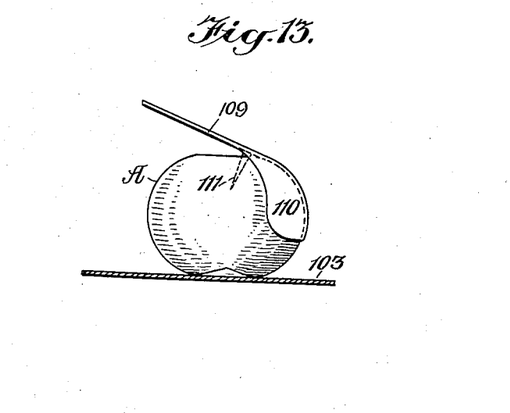
Fig. 13 is a side elevation of one of the resilient elements forming part of the means for removing the peeled fruit from the holders and hereinafter more particularly referred to, the auxiliary table over which the peeled fruit is caused to travel being shown in longitudinal vertical section.

From the washer 61 the belt 20 travels with the holders and impaled tomatoes about slitting means designated generally by the numeral 63 comprising the following instrumentalities: A cylindrical head 64 is rigid with a fixed standard 65 suitably supported at its lower end as on a bracket 66 (Figs. 1 and 2) on the frame of the machine. Beneath the head 64 is a frame or wheel 67 secured by set screws 68 or other means to a sleeve or hollow shaft 69 surrounding the standard 65 and having suitable support at its lower ends as on the bracket 66, said sleeve having rigid thereon a sprocket wheel 70 engaged by the chain 20 to thereby drive said sleeve and frame 67. Carried by the frame 67 at the exterior of the head 64 is a series of tubular spindles 71 adapted to have vertical movement in guides 72 rigid with said frame and each presenting a vertical slot 73 at the inner side. Each tubular spindle 71 carries at the inner side a roller 74, the shank 75 of which extends laterally inward through the slot 73, the roller being received in a cam groove 76 formed in the head 64 at the outer cylindrical surface. On its lower end each spindle 71 carries a slitting device for slitting the tomatoes skin-deep to divide the skin into sections on meridian or approximately meridian lines, the slitting device corresponding generally with the slitting device fully described in my aforenamed application as to comprising resilient fingers 77 grouped about the spindle and bowed vertically, the lower ends carrying rollers 78, the rollers in practice being concave and said fingers presenting suitable cutter elements 79 and there being pilot rollers 80 as fully described in my patent referred to. In accordance with the present invention I provide means for expanding the group of fingers 77 in the upward movement of the slitting spindle to cause said fingers to clear the tomato in moving upward with the spindle after a downward cutting movement. Said expanding means is composed of a disk 81 on the lower end of a spindle 82 movable vertically in the tubular spindle 71 and capable of relative movement thereto. Each interior spindle 82 carries at the inner side thereof a roller 83, the shank 84 of which extends through a vertical slot 85 in the upper end of spindle 71 and through the slots 73 of the guide 72. Said roller 83 travels in a second cam groove 86 in the cylindrical head 64 above the groove 76. The cam grooves 76, 86 generally follow corresponding curvatures and normally the spreading disk 81 is maintained in its lower position clear of the fingers 77, said disk and its carrying spindle 82 moving generally to correspond with the up and down movements of the tubular spindle 71 and its slitting means. As seen, however, at the left of Fig. 7 the cam groove 86 has at one portion thereof a surface 86^a more pronounced than the corresponding surface of the groove 86 so that when said groove surface 86^a is reached by a roller 83, said roller will be carried upwardly more rapidly than the adjacent roller 74 of the adjacent spindle 71, the result being that the disk 81 is carried upwardly against the fingers 77 spreading the same as indicated at the left of the center of Fig. 7. With the described slitting means the positions and speed of the slitting units are such relatively to the travel of the belts 20 that a holder 26 will be presented beneath a slitting unit as the latter arrives at the front of the machine, whereupon the grooves 76, 86 will cause the rollers 74, 83 to descend and carry the spindles 71, 72 downwardly for the cutting elements 79 to slit the tomato, skin-deep on meridian lines as at a, Fig. 7, after which the raising of the roller 83 and spreading spindle 82 will, through the disk 81, spread the fingers 77, permitting the spindles to rise without contact with the tomato.

After the slitting of the fruit the latter is carried to devices for cutting the skin circularly adjacent to the bottom of the tomato and to devices for topping the tomato, said devices being here only conventionally indicated as they are disclosed and described in detail in my afore-named patent, suffice it to say that a bar 87 presenting teeth or spurs 88 projecting from a face thereof transverse to the path of movement of the fruit serves to puncture the fruit near the bottom by reason of the holders 26 with the fruit thereon being given a turning movement about their axes as they move past said bar, for which purpose the holders have gear wheels 89 fast thereon, adapted to engage a fixed rack 90 adjacent to and below bar 87 beneath the table 24. The numeral 91 indicates an arm constituting a presser guide beneath which the fruit travels to the revolving topping knife 92, the rack 90 having a sufficient length to turn the holders 26 on their axes while passing said knife. In other respects the topping means is the same as described in my above-mentioned patent.

The topped and slitted fruit and with the bottom portion punctured, is carried by the belt 20 from the topping cutter to and past scalding means including a casing 93, said scalding means simply consisting of hot water spray pipes as fully described in my patent mentioned.

From the scalding means the belt carries the tomatoes to the peeling device proper or device for removing the skins, which includes a revolving circular skin-detaching device designated generally by the numeral 94 and an endless traveling presser device 95 to maintain the fruit in proper contact with said detaching device. The rotary skin-detaching device 94 includes a wheel 96 loosely mounted upon the upper end of the shaft 32 above the table 24 and driven in the manner hereinafter explained. At the periphery of said wheel 96 is a flexible annular band 97 provided with a multiplicity of teeth 98. In my present invention resiliency is given to the band 97 through the medium of bowed spring arms 99 secured between their ends to the wheel 96 and having their opposite ends suitably secured, respectively, to the top and bottom edges of said band, the arrangement permitting the band to yield radially to the pressure exerted by the presser device 95 on the tomatoes presented to the band. The presser device 95 comprises an endless chain carrying resilient cup-like presser units 100 composed of a plurality of separate curved fingers, each presenting a comparatively broad surface. The presser units 100 are so spaced on the device 95 and said device has such a speed relatively to the belt 20 and holders 26 that the presser unit will be presented laterally to engage a tomato at the opposite side from the detaching device 94 as the tomatoes arrive at said detaching device. A differential speed may be imparted to the skin-detaching device 94 and the endless presser device 95, in effecting the rubbing action necessary to remove the skins. Also, during the passage of a tomato about said detaching device 94, the holder 26 carrying said tomato is revolved about its own axis by reason of the pinion 89 thereon, meshing with a fixed curved rack 101 at the under side of the table 24 and the turning movement of the holder about its axis will be in the reverse direction to the peripheral movement of the detaching device 94. The flexibility of the band 97 and the resiliency imparted thereto by the springs 99 will cause said band to conform substantially to the curved surface of the tomato to cause an engagement of the teeth 98 with the skin and effect the removal of the latter. The detachable skins adhere to the toothed band 97 and are therefore carried laterally inward over the table 24. Suitable provision is made for detaching the skins from the band 97 and cleaning the latter, there being indicated in Fig. 2 a jet pipe 102 adapted to have connection with any convenient source of water supply, said pipe acting to deliver a jet of water against the surface of the band.

The belt 20 with the tomatoes thereon passes about the detaching device 94 to the feed side of the machine and in the direction of the rails 30 where the tomatoes are initially placed on the holder. At said feed side of the machine adjacent to the detaching device 94 an elevated platform 103 is provided on the table 24, together with a ramp 104 leading upwardly to said platform from the table surface and from the other end of the platform 103, a chute 105 leads laterally outward from the machine for the escape of the peeled tomatoes. In order to carry the tomatoes upwardly on the ramp 104 and cause the detachment of the tomatoes from the holders 26 by causing said tomatoes to move upwardly from the plane of travel of the spurs 28, I provide an auxiliary carrying and detaching belt 106, the runs of which travel in a vertical plane about sprockets 107 turning about horizontal axes in brackets 108 or equivalent supports on the table 24. Said belt 106 carries grab fingers 109, the ends 110 of which are curved and broadened, there being also advantageously provided on each finger spurs 111, said broadened end being adapted to engage a tomato A at the back thereof as the tomato travels forwardly upon leaving the skin-detaching device 94, while the spurs 111 penetrate the tomato giving a positive engagement of the finger therewith. The belt 20 carries the tomato to and partly upward on the ramp 104, thereby effecting the engagement of a tomato with a finger 109 so that the travel of the belt 106 will complete the upward travel of the tomato on the ramp and move it along the platform 103 toward the chute 105. The chute 105 may have an adjustable side member 105$^a$ here shown as having a slotted arm 105$^b$ receiving a bolt 105$^c$ for the adjustment of said side to vary the effective width of the chute.

The tomatoes in passing over the platform 103 are subjected to the action of a coring device hereinafter further referred to for removing the bottom portion of the tomato and the core. The coring device is essentially the same as that disclosed in my patent above referred to, comprising a pair of rotary disk-like cutters 297 secured to upwardly divergent shafts 298 so that the cutters converge at their adjacent edges to produce an inverted V-shaped cut in the tomato as it passes over the said cutters for severing the bottom portion of the tomato and the adjacent core part, said shafts 298 being driven in the manner hereinafter described.

By the machine constructed and arranged as described, it will be seen that by reason of the belt 20 with the runs thereof in a horizontal plane or substantially so while the holders 26 are vertically disposed, I am enabled to utilize the complete stretch of the belt in its runs along the sides and across the ends of the machine for carrying the fruit past the various successively acting organisms for effecting the different operations described instead of having a material portion of the belt constituting an idle run. Thereby, the maximum compactness of the machine structure is obtained, making for convenience and the economy with which the machine may be attended, a material contribution to the convenience being the delivery of the peeled tomatoes at the feed side of the machine, adjacent to the point of the initial placing of the tomato in the machine.

The driving of the driven devices of the respective organisms and the coördination of said organisms with the horizontal travel of the carrier belt 20 are effected in the illustrated example by the following instrumentalities, in addition to the driven sprocket wheels 31, 33, 49 and 70, to wit: The driven tubular shaft 69 has a large belt pulley 112 fast thereon beneath the machine bed 23 (see Figs. 1 and 2) over which a belt 113 travels to and about a pulley 114 on a vertical shaft 115, extending upwardly through bed 23 and table 24 and rising above the rotary topping knife 92. The upper end of said shaft carries a pulley 116 over which a belt 117 runs to and about a pulley 118 on a vertical shaft 119 carrying said rotary knife 92, the shaft 115 turning in suitable bearings in the machine including bearings in a frame 120 and above the table 24 the shaft 119 having its bearings in said frame. To drive the traveling presser device 95 of the peeling mechanism, the belt of said device runs about pulleys 121, 121$^a$ on the vertical shafts 122, 123, the latter shaft having a pinion 124 thereon beneath the bed 23 and meshing with an intermediate pinion 125 which in turn meshes with a third pinion 126 in mesh with a gear wheel 127 on the shaft 32, the pinions 125, 126 being mounted respectively on stud shafts 128, 129 depending from the under side of the bed 23. To drive the rotary skin-detaching device 94 at a different speed from that of the fruit about said device, the illustrated drive means may be as follows: A pinion 136 is fixed on shaft 139 and meshes with an intermediate pinion 134 on a stud shaft 135 depending from the table 24, said pinion 134 in turn meshing with a pinion 131 on a shaft 132 extending upwardly through table 24 and carrying above said table a second pinion 131$^a$ meshing with a pinion 130 fixed on the hub of the wheel 96. The shafts 298 of the rotary coring cutters 297 are driven from the gear wheel 127 as follows: Meshing with said gear wheel is a pinion 137 rigid with which is a bevel pinion 138, said pinion being on a vertical shaft 139. Meshing with the bevel pinion 138 is a similar pinion 140 on a horizontal shaft 141 carrying two pulleys 142 over which belts 143 run obliquely upward and over pulleys 144 on separate shafts 145, turning in bearings in brackets 146 supported between the bed 23 and table 24 on any fixed frame members 147 and adjustable vertically on the latter by reason of bolts 148 and slots 149. On the shafts 145 are bevel gear wheels 150 meshing with bevel pinions 151 on the cutter shafts 298 which are disposed obliquely and turn in bearings on arms 152 rigid with the bracket 146. Thus, notwithstanding any vertical adjustment of the brackets 146, the pinions 151 will be maintained in mesh with the driving bevel wheels 150 and thereby said brackets may be freely adjusted to vary the depth with which the cutters 297 will remove the bottom and core of the tomato.

The auxiliary belt 106 for carrying the fingers 109 for detaching the tomatoes from the belt 20 and carrying the same to the platform 103 is driven as follows: On the upper end of the vertical shaft 139 is a bevel pinion 153 meshing with a similar pinion 154 on a horizontal shaft 155 provided with a second bevel pinion 156 meshing with a bevel pinion 157 on a horizontal shaft 158 to which one of the sprocket wheels 107 is keyed for driving the belt 106.

Reverting to the ribs 52 it will be observed that they are formed angularly on a roller 52ª loose on each spindle 45 so that they may roll over the surface of the cam head 41 while the spindle is confined to vertical movements.

The endless belt of the presser device 95 passes against a suitable system of guide rollers 95ª to constrain the belt to travel in the proper path irrespective of whether fruit is presented thereto to receive pressure of the individual presser devices 100.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A machine for peeling tomatoes or similar articles, including an endless carrier belt having its runs approximately in a horizontal plane, holders on said belt adapted to receive the individual articles and accessible at the feed point of the machine for the placing thereon of the articles to be peeled, and means disposed about the machine adjacent to the path of travel of the belt, to perform successive operations on the articles for effecting the removal of the skins.

2. A machine for peeling tomatoes or similar articles, including an endless carrier belt having its runs approximately in a horizontal plane, holders on said belt adapted to receive the individual articles and accessible at the feed point of the machine for the placing thereon of the articles to be peeled, means disposed about the machine adjacent to the path of travel of the belt, to perform successive operations on the articles for effecting the removal of the skins, and means to deliver the peeled articles adjacent to the feed point of the machine.

3. A machine for peeling tomatoes or similar articles, including an endless carrier belt having its runs approximately in a horizontal plane, vertically disposed holders on said belt at intervals adapted to have the individual articles impaled thereon and accessible at the feed point of the machine for the placing thereon of the articles to be peeled, means disposed about said machine adjacent the path of travel of the belt for slitting the skins, removing the skins in sections, and delivering the peeled articles adjacent to the feed point of the machine.

4. A machine for peeling tomatoes or similar articles, including an endless conveyer belt, holders on said belt on which the articles are adapted to be impaled and accessible at the feed point of the machine, for the placing of the articles on the said holders, guard means at said feed point and extending beyond the latter to form a rest for the articles and limit the degree of the initial impalement in the placing of the articles. and a plurality of separate means beyond said guard means between the same and the feed point of the machine, to perform successive operations on the articles for effecting the removal of the skins, said last-mentioned means including mechanism to exert an impaling pressure on the articles after leaving said guard means.

5. A machine for peeling tomatoes or similar articles including an endless carrier belt having its runs approximately in a horizontal plane, holders on said belt on which the articles are adapted to be impaled, said holders being accessible at the feed point of the machine for the placing thereon of the articles, and separate means disposed about the machine adjacent to the path of travel of the belt for performing successive operations on the articles to effect the removal of the skins, said means including mechanism adjacent the feed point of the machine, to exert an impaling pressure on the articles.

6. In a machine for peeling tomatoes or similar articles, carrier means including holders adapted to receive the individual articles to be peeled and accessible at the feed point of the machine for the placing of the articles thereon, and means beyond said feed point for exerting an impaling pressure on the placed articles.

7. In a machine for peeling tomatoes or similar articles, carrier means including a series of holders, on which the articles are adapted to be impaled, said holders being accessible at the feed point of the machine for the placing of the articles thereon, pressure devices arranged to have traveling movement at approximately the speed of said holders and adjacent the path of travel of the latter, and means to give forward and reverse movements to the traveling presser devices toward and from the path of travel of the holders for exerting impaling pressure on the articles and then releasing the same.

8. In a machine for peeling tomatoes or similar articles, carrier means including holders adapted to have the individual articles impaled thereon and accessible at the feed point of the machine for the placing of the articles, a series of impaling devices, means to carry said impaling devices in succession adjacent to the path of travel of said holders, and means to give movement to the impaling devices alternately toward and from the holders, as said impaling devices move adjacent to the path of travel of the holders, for exerting an impaling pressure on the articles and then releasing the latter.

9. In a machine for peeling tomatoes or similar articles, carrier means including holders adapted to have the individual articles impaled thereon and accessible at the feed point of the machine for the placing of the articles, guard means at said feed point of the machine and extending beyond the same presenting a support on which the placed articles may rest as the holders carry the articles forwardly, said guard means being in position to limit the degree of impalement of the articles on the holders, and impaling means to which said surfaces lead, said impaling means comprising spindles, revoluble means carrying said spindles in spaced relation corresponding with the relative positions of the holders, said spindle carrier means being operable to successively bring the spindles in line with the arriving holders, presser means on said spindles to exert an impaling pressure on the articles carried by the holders, and means to move said spindles in succession toward and from an alined holder for impaling the articles and then releasing the same.

10. In a machine for peeling tomatoes or similar articles, carrier means including holders adapted to have the individual articles impaled thereon and accessible at the feed point of the machine for the placing of the articles, guard means at said feed point of the machine and extending beyond the same forming a support on which the placed articles may rest as the holders carry the articles forwardly, said guard means limiting the impalement of the articles when placed, and impaling means to which said support leads, said impaling means including a fixed head presenting an endless cam surface, and series of spindles disposed about said cam head and each having a member adapted to travel on said cam surface, means mounting said spindles in spaced relation to correspond with the relative positions of said holders and adapted to carry the spindles successively into alinement with successively arriving holders, a spring adapted to be engaged by the successive spindles as they aline with the holders and tending to move the latter toward the path of the holders, presser means on each spindle to exert an impaling pressure on an article on an alining holder, and co-engaging means on said cam head beyond said spring and on the respective spindles and engageable at different heights from the holders to give an impaling movement to the spindle irrespective of the size of the article to be engaged.

11. In a machine for peeling tomatoes or similar articles, carrier means including holders adapted to have the individual articles impaled thereon and accessible at the feed point of the machine for the placing of the articles, guard means at said feed point of the machine and extending beyond the same forming a support on which the placed articles may rest as the holders carry the articles forwardly, said guard means limiting the impalement of the articles when placed, and impaling means to which said guard means leads, said impaling means including a fixed head presenting an endless cam surface, and series of spindles disposed about said cam head and each having a member adapted to travel on said cam surface, means mounting said spindles in spaced relation to correspond with the relative positions of said holders and adapted to carry the spindles successively into alinement with successively arriving holders, a spring adapted to be engaged by the successive spindles as they aline with the holders and tending to move the latter toward the path of the holders, presser means on each spindle to exert an impaling pressure on an article on an alining holder, and co-engaging means on said cam head beyond said spring and on the respective spindles and engageable at different heights from the holders to give an impaling movement to the spindle irrespective of the size of the article to be engaged, said co-engaging means including a ribbed roller on each spindle, and a vertical series of arcuate ribs on said cam head.

12. In a machine for peeling tomatoes or similar articles, carrier means including holders adapted to have the individual articles impaled thereon and accessible at the feed point of the machine for the placing of the articles thereon, impaling means adapted to exert impaling pressure on the placed articles, and means to cause said presser means to exert impaling pressure, said impaling means including presser cups presenting a cluster of separate elements, a resilient disk supporting said elements, springs outside of said elements adapted to be engaged by the latter when flexed, and backing means adapted to limit the flexure of said springs.

13. A machine for peeling tomatoes or similar articles, including a traveling carrier, holders thereon adapted to receive the individual articles, and means adjacent the path of travel of said carrier for slitting the articles skin-deep preliminary to removing the skins, said slitting means including slitting elements, and means to spread said slitting elements after a slitting operation for clearing the articles on the reverse movement after the slitting action.

14. A machine for peeling tomatoes or similar articles, including an endless carrier belt having its runs approximately in a horizontal plane, holders on said belt adapted to receive the individual articles and accessible at the feed point of the machine for the placing thereon of the articles to be peeled, and means disposed about the machine adjacent to the path of travel of the belt, to perform successive operations on the articles for effecting a peeling action on the articles; together with coring means in a position to operate on the bottom of the peeled article.

15. A machine for peeling tomatoes or similar articles, including an endless carrier belt having its runs approximately in a horizontal plane, holders on said belt adapted to receive the individual articles and accessible at the feed point of the machine for the placing thereon of the articles to be peeled, and means disposed about the machine adjacent to the path of travel of the belt, to perform successive operations on the articles for effecting a peeling action on the articles; together with means for detaching the articles from the holders after said peeling action, and coring means adapted to operate on the bottom of an article after detachment from a holder.

16. A machine for peeling tomatoes or similar articles, including an endless carrier belt having its runs approximately in a horizontal plane, holders on said belt adapted to receive the individual articles and accessible at the feed point of the machine for the placing thereon of the articles to be peeled, and means disposed about the machine adjacent to the path of travel of the belt, to perform successive operations on the articles for effecting a peeling action on the articles; together with means for detaching the articles from the holders after said peeling action, coring means adapted to operate on the bottom of an article after detachment from a holder, and means to cause the peeled and cored article to be delivered adjacent to the feed point of the machine.

17. A machine for peeling tomatoes or similar articles including an endless carrier arranged to travel about the machine, holders on said carrier adapted to receive the individual articles and accessible at the feed point of the machine for the placing thereon of the articles to be peeled, means disposed along the path of said carrier to effect a peeling action on the carried articles, means to cause an upward detaching movement of the peeled articles, and an auxiliary carrier to advance the detached articles along the machine.

18. A machine for peeling tomatoes or similar articles including an endless carrier arranged to travel about the machine, holders on said carrier adapted to receive the individual articles and accessible at the feed point of the machine for the placing thereon of the articles to be peeled, means disposed along the path of said carrier to effect a peeling action on the carried articles, means to cause an upward detaching movement of the peeled articles, and an auxiliary carrier to advance the detached articles along the machine; together with means to core the detached articles as they are advanced by said auxiliary carrier.

19. In a machine for peeling tomatoes or similar articles, a traveling carrier adapted to receive the articles to be peeled and peeling means including a wheel past which said carrier travels, a band on said wheel presenting skin-detaching means, and spring elements yieldably sustaining said band to present a concave form; together with traveling means to exert pressure on the carried articles against said band.

20. A machine for peeling tomatoes, including a traveling carrier, holders thereon adapted to receive the individual articles, and slitting means adjacent the path of travel of said carrier for slitting the articles skin-deep, said slitting means including axially movable spindles, resilient fingers thereon having cutters adapted to act on the tomato skins, means to give traveling movements to the spindles in the same direction as the carrier, means to move said spindles toward the holders for slitting and return the spindles after the slitting operation, and means to dispose the fingers in spread form and disengaged from the tomatoes to clear the latter upon the return movement of the spindles.

21. A machine for peeling tomatoes, including a traveling carrier, holders thereon adapted to receive the individual articles, and slitting means adjacent the path of travel of said carrier for slitting the articles skin-deep, said slitting means including vertically movable spindles, resilient fingers having cutters adapted to engage the tomato skins, means to give traveling movement to the spindles in the same direction as the carrier, means to lower said spindles for slitting and to raise said spindles after the slitting operation, and means to dispose the fingers in spread form and disengaged from the tomatoes upon an upward movement of the spindles, said last-mentioned means comprising spreader elements within the fingers carried by each of said spindles, a spindle arranged within each of the finger-carrying spindles and mounting said spreader elements, and means to give relative movement to said spindles on the up-stroke to bring said spreader element into engagement with the fingers.

CHARLES KIRINO.